United States Patent [19]

Fauser

[11] 3,791,370
[45] Feb. 12, 1974

[54] DEVICE FOR COOKING FOODS

[75] Inventor: Hans Fauser, Flamatt-Friburg, Switzerland

[73] Assignee: Societa'Italiana Superior S.r.L., Milan, Italy

[22] Filed: Apr. 7, 1972

[21] Appl. No.: 242,011

[30] Foreign Application Priority Data
April 13, 1971 Italy........................23087A/71

[52] U.S. Cl. ............ 126/25 A, 126/9 B, 126/299 R
[51] Int. Cl. ............................................. F24b 3/00
[58] Field of Search .................. 126/9, 275, 299, 25

[56] References Cited
UNITED STATES PATENTS

| | | | |
|---|---|---|---|
| 2,551,026 | 5/1951 | Loeher et al.................... | 126/299 C |
| 3,266,483 | 8/1966 | Keel................................ | 126/275 R |
| 3,503,324 | 3/1970 | Gmeiner.......................... | 126/9 X |
| 2,497,994 | 2/1950 | Jones............................... | 126/9 R |

*Primary Examiner*—Edward G. Favors
*Attorney, Agent, or Firm*—Marvin Jacobson

[57] ABSTRACT

A device for cooking foods, and in particular for preparing foods by grilling, spit roasting, oven roasting, and the like provided with a collapsible hood structure for protecting the cooking zone, for evacuating fumes and for ensuring maximum overall efficiency. The device comprises a grill and a collapsible food cooking assembly arranged above the cooking zone and including cooking plates and the collapsible hood structure has not only rear and side walls but also plate members removably arranged between the side walls at the front and the top of the device so as to define a hood space having an outflow opening for the fumes variable in size by displacing the plate members for adjusting the air draught through the device according to the food preparing requirementes.

8 Claims, 5 Drawing Figures

DEVICE FOR COOKING FOODS

BACKGROUND OF THE INVENTION

The present invention relates to improvements in devices for cooking foods, and in particular for preparing foods by grilling, by spit roasting, by oven roasting, or the like. The present invention is particularly but not exclusively applicable to devices used outdoors or on terraces. By way of example, it may be applied to devices in which the means for heat generation are of the type described in the Italian patent No. 903232 however the invention is independent of these particular means, for example the members for supporting the fuel, and for the introduction of primary and secondary combustion air, etc. The invention is consequently applicable in general to any device for preparing foods, even if not intended for use outdoors, and irrespective of the manner in which the parts not directly associated with the present invention are constituted.

SUMMARY OF THE INVENTION

According to one of the characteristics of the present invention, the device for cooking foods is provided with a hood for protecting the cooking zone, for releasing smoke and for ensuring a better efficiency of the complex, comprising a structure composed of various members, which has an operating position in which said members define a hood space open at the bottom for the inflow of fumes from the combustion zone of the device and open at the top for their outflow upwards, and an inactive position in which said members are mutually disposed so as to give minimum overall dimensions.

Preferably said hood structure is housed, in its inactive and minimum dimensions state, in the fixed supporting and/or cover structure of the device, when the device is not operating.

In a particular aspect of this characteristic of the invention, said hood structure comprises mobile members of substantially flat configuration which circumscribe a hood space defined by their disposition in mutually substantially perpendicular planes and by their mutual joining substantially at their edges, and the inactive position is defined by their disposition in parallel planes and in substantial reciprocal adjacency.

Preferably the passage of the hood structure from the operating position to the inactive position takes place by folding back and/or disassembling its constituent members.

In another aspect of said characteristic of the invention, said hood structure is housed and covered, when in the inactive state, by mobile cover members which protect all the working parts of the device, and in particular the combustion zone and the cooking shelf, when the device is not in operation.

In another preferred embodiment, said hood structure comprises members which can be folded back about hinges which connect them to fixed parts of the device, and dismountable members, spaces being provided in the mobile cover members of the device or between them and other parts of the device for housing the dismountable parts and the parts which can be folded back, in such a manner that they give practically no bulk when the device is not in operation and can be rapidly and easily brought into the operating position.

The aforementioned parts are preferably of metal sheet.

In another characteristic of the invention, the fixed supporting and/or cover structure of the cooking device houses members which are at least partially refractory and adapted for disposition in a suitable working position with respect to the combustion zone, and preferably above it, in such a manner as to form an oven structure adapted for cooking pizzas and the like when desired, and without further transformation of the device.

Preferably the refractory portions of the oven structure determine, when in the working position, two horizontal superimposed planes spaced one from the other, the smoke passing between them and lapping the upper plane, so heating it and causing it to radiate heat in the direction of the foods placed on the lower plane lying above the combustion zone.

In a preferred embodiment of the invention, the lower oven plane is defined by the contiguity of two refractory members disposed in the two lateral halves of the cooking device.

In a further aspect of the invention, said constituent members of the oven structure are compatible and cooperate with the hood members so as to determine, when all members are in operation, the desired passage for the smoke to flow from the combustion zone upwards.

Preferably the oven members are housed, when in the operating position, in the hood space, so determining a reduced lower aperture for the inflow of the air and a zig zag passage for the smoke in said space in the direction of the upper aperture for outflow of the smoke.

Preferably housings are provided in the fixed supporting and/or cover structure of the device for the oven members, which are housed there in the inactive position, with minimum dimensions, when the cooking device is not in operation.

BRIEF DESCRIPTION OF THE DRAWINGS

These and other preferred characteristics of the invention will be more evident from the description given hereinafter of one embodiment with reference to the accompanying drawings in which:

FIGS. 3 and 4 are views analogous to FIGS. 1 and 2 of the same device, working as an oven for cooking pizzas and the like;

DESCRIPTION OF THE PREFERRED EMBODIMENT

Figure 1:
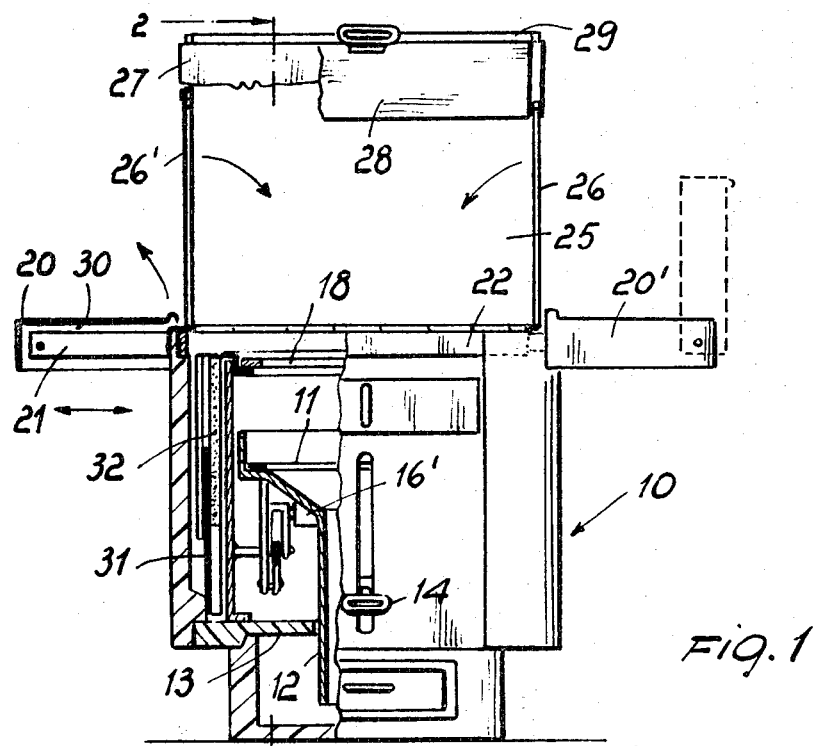
FIG. 1 is a frontal view of one embodiment of the cooking device according to the invention when cooking foods by grilling, with the frontal parts partially removed in order to illustrate the internal working members.

In FIG. 1, by way of example, the device is shown provided with means for combustion and inflow of air such as those described in the aforementioned Italian patent No. 903232 these means being illustrated only diagrammatically, it being emphasised that the invention is not restricted to this particular embodiment but may be applied to cooking devices provided with any means for combustion and inflow of air.

With reference to the figures, the cooking device comprises a fixed supporting and cover structure (or casing) indicated generally by the reference numeral 10 and comprising a suitable association of metal members and conglomerate or other suitable members, said casing or supporting and cover structure being of generally parallelopiped conformation, thus defining a box-shaped housing. Internal to the structure 10 are housed the heat generating devices or combustion assembly comprising, in the particular embodiment illustrated by way of example a combustion grill 11, defining a combustion zone in which a solid fuel is placed, and a metal member 12 with an upper part in the form of a funnel and a lower cylindrical part, which passes through an aperture in a bottom plate 13 of the supporting structure 10 and defines an air inlet. The assembly comprising the grill 11 and tubular member 12 can be moved vertically by any suitable means, for example by a driving handle 14 which operates a mechanism comprising levers 15, 15', counterweights 16, 16' and tie rods 17, 17'. The combustion grill 11 defining the combustion zone, is in a low position in FIGS. 1–2 and in a raised position in FIGS. 3–4. Above it is a removable grill member 18 which forms a cooking shelf. Where the expression "cooking shelf" is used in the present patent, it refers to that defined by the grill 18, even though when the device operates as an oven and cooking is carried out in a space defined by other members. The working parts situated internal to the casing 10, and in particular the combustion zone and cooking shelf, are protected from above, when the cooking device is not working, by two contiguous covers 20 and 20', arranged on guides 21 which run on a frame 22 (see FIG. 5) fixed to the structure 10. When the device is working the covers 20 and 20' reach an external position beyond the cooking zone, so forming useful resting surfaces and uncovering the food supporting arrangement and allowing the upward passage of the smoke originating from the combustion of the material disposed on the combustion grill 11 underneath.

In the embodiment illustrated, the collapsible hood according to the present invention comprises three sheet members, that is a back plate as panel 25 and two side plates or panels 26, 26', these three plates when in the operating state being disposed in mutually perpendicular vertical planes and joined along their edges so as to form two corners of a hood space, and hinged to the structure 10 by their lower edges so as to rotate about horizontal axes. In order to facilitate the joining of the three plates, one or more of them, for example the plate 25, may have its edges bent so as to form a channel for receiving the edge of the adjacent perpendicular plate. On turning about the horizontal hinges, the three plates recline and lay horizontally one on the other, above the cooking shelf.

The hood is completed by two plate members 27 and 28 of different inclination which engage with the said two side plates, 26, 26', and rest on them, preferably with their side edges bent to form a groove (see FIG. 5), leaving an upper passage 29 for smoke exit.

Figure 2:
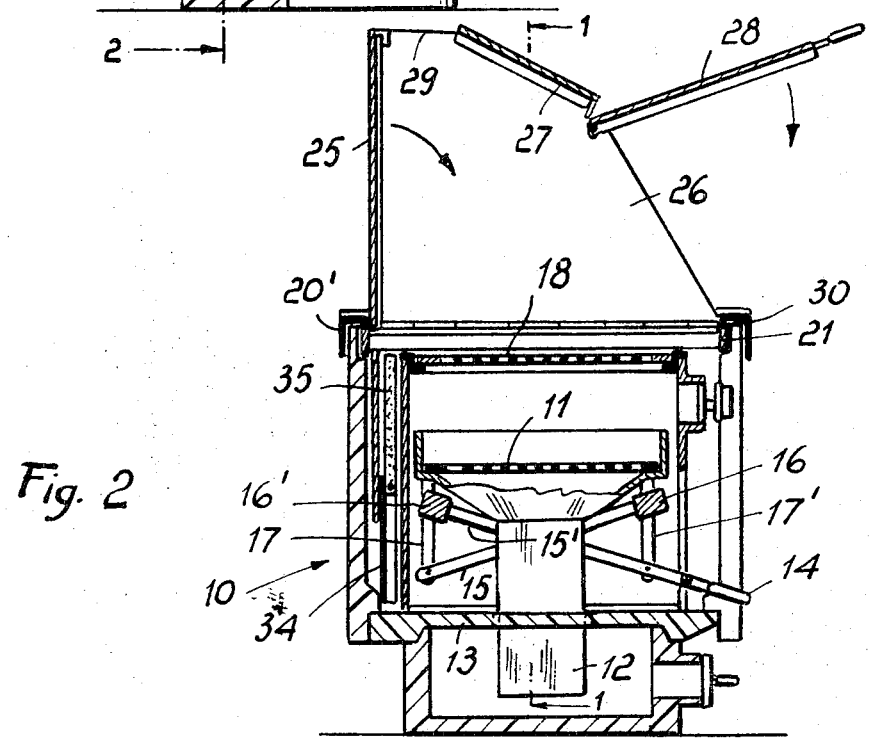
FIG. 2 is a vertical section on the plane 2—2 of FIG. 1 of the device shown in FIG. 1, seen in the direction of the arrows.

The plates 27 and 28 are perpendicular to the plates 26, 26' with which they are contiguous so as to form therewith and with plate 25 a hood space around and above the open top of the box-shaped housing. The plates 27 and 28 are not parallel to the plate 25. The plate 28 may be made to turn upwards so as to uncover the cooking shelf, as shown in FIG. 2, or may have a transparent portion for allowing the cooking to be supervised.

Means may be provided for locking the five said plates, or some of them, in the operating position, but this is not necessary because they are self-supporting and locking because of their engagement at their edges. Means are further provided for locking plate 28 in a number of positions as those shown in FIGS. 1, 4 and 5.

Figure 5:
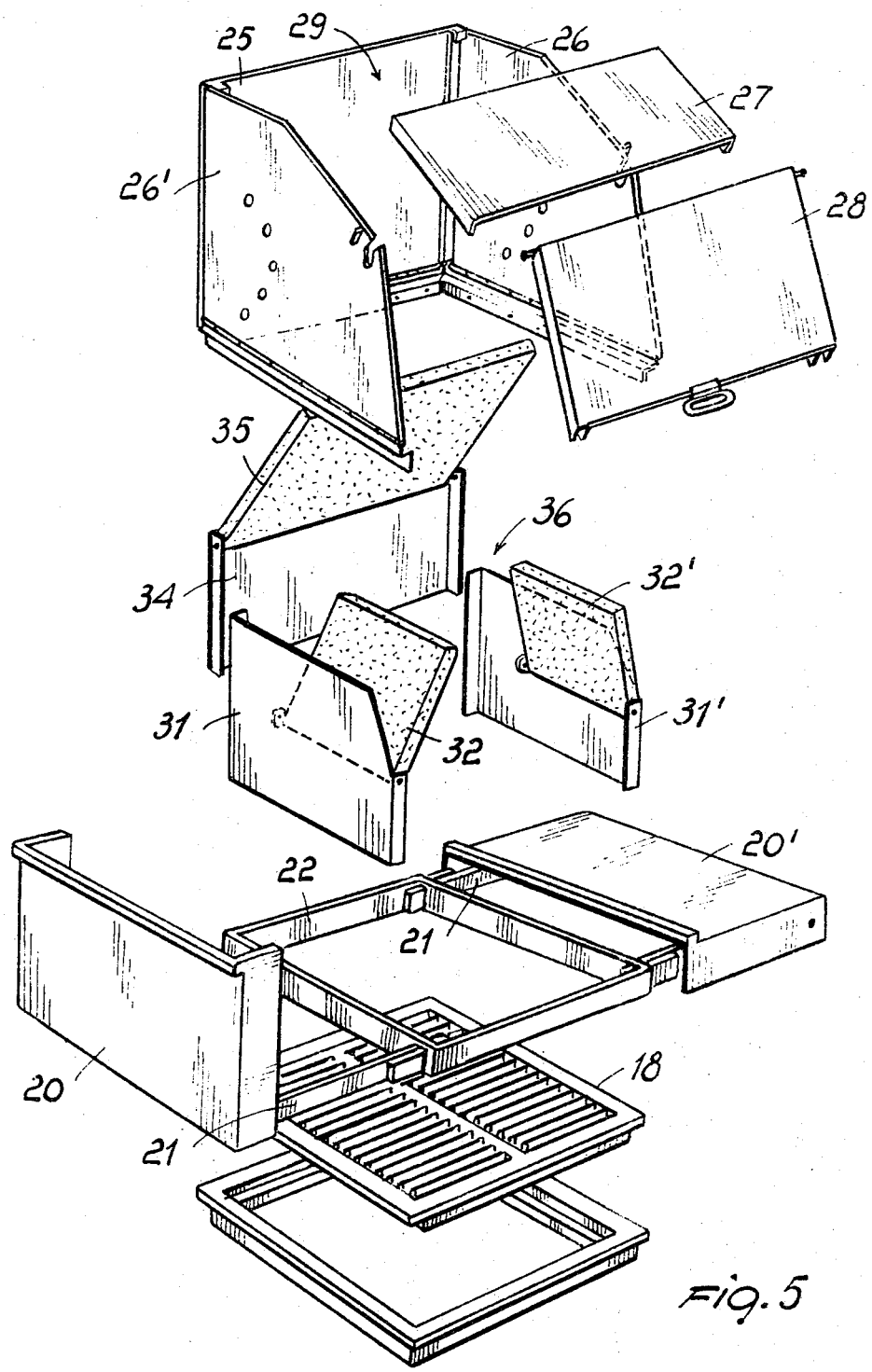
FIG. 5 is an exploded perspective view showing the hood members, the members which cooperate in forming the oven, and the mobile cover members of the device, shown distanced apart.

As shown in FIG. 5, the plates 26, 26' are provided with a series of holes which serve as seats for mounting a spit in one of the various possible positions, the grill 18 then being removed.

In order to set the cooking device in the inactive state, the two said plates 27 and 28 are withdrawn from the plates 26 of the hood and housed in the covers 20, 20' in the interspaces below their upper planes (as shown by the reference numeral 30 in FIGS. 1 and 2), or are arranged on the cooking shelf resting on the grill 18 or frame 22, at such a level as to be first covered by the plates 25, 26 and 26' when they are folded back, and then by the covers 20, 20'.

Then the plates 26, 26' and 25 are folded back one on the other. Finally the covers 20, 20' are closed by sliding their guides 21 on the frame 22 until the whole of the cooking shelf is covered.

It can be seen that with this disposition those parts of the hood which can be folded back and dismounted are housed when in the inactive state in such a manner that the entire complex is contained under the covers, and the cooking device appears when not in operation with a closed upper surface.

Said cooking device according to the embodiment illustrated in the present invention is provided with a collapsible food cooking assembly which allows its transformation into an oven. To this end it comprises two substantially flat supporting members 31, 31' each provided with a pivoted cooking plate 32, 32'. When the cooking plates 32, 32' are vertical (see FIG. 2) they can slide vertically and sit in vertical interspaces formed laterally in the fixed supporting structure. To transform the device into an oven, the members 31, 32 and 31', 32' are pulled upwards, for example by means of separate hocks, not shown, or by any easily constructed gripping means, and when they reach their highest position, the cooking plates 32 and 32' are rotated towards the centre of the cooking zone, so assuming the horizontal position shown in FIGS. 3 and 4. The plates 32, 32' are of refractory material and being disposed contiguous horizontally they constitute the oven bottom made of two separate half shelves.

Figure 3:
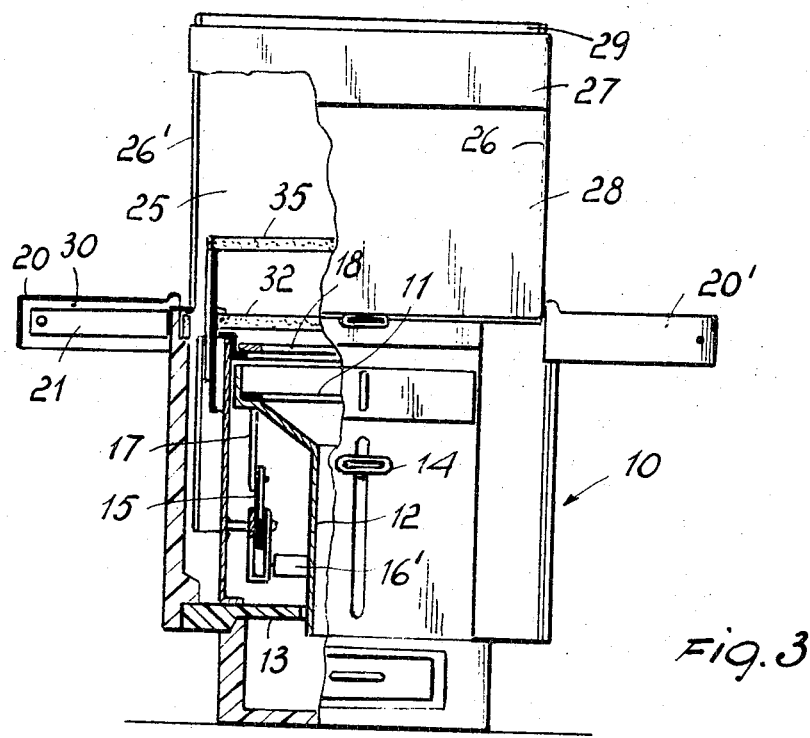

The oven is completed by an upper cooking plate comprising a vertical part 34 and a part 35 pivoted to it, housed in an interspace in the back wall of the fixed supporting structure, said plate being raised in the same manner as the members 31, 32 and 31', 32', the part 35 then being rotated frontwards so that it constitutes the oven roof, positioned above the floor formed by the parts 32 and 33', as shown in FIG. 3. The plate or shelf 35 is of a refractory or other suitable material, whereas the parts 34, 31 and 31' are preferably of sheet metal. As shown in the drawings the plate 35 is pivoted around an axis orthogonal to the axis around which the half shelves or plates 32, 32' are pivoted.

Figure 4:
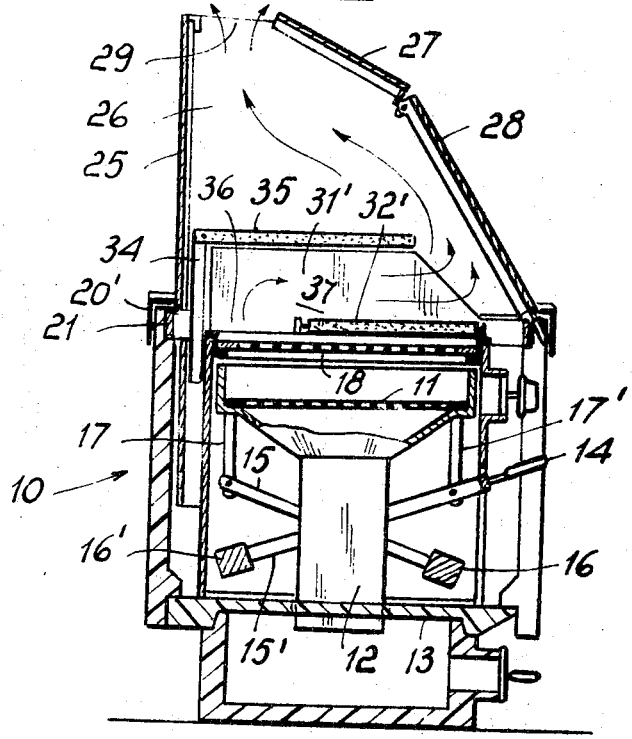

The dimensions of the described cooking plates or shelves 32, 32' and 35 are such that they are partially superimposed and the floor formed by the members 32, 32' reaches frontwards to about the end of the cooking shelf but at the back leaves a passage open as shown in FIG. 4 by the reference numeral 36, through which the hot fumes produced by combustion may rise until they reach the roof 35, which deviates them causing them to flow horizontally lapping the roof, and as the roof reaches frontwards as far as the end of the cooking shelf the fumes escape through the passage 37 into the aforementioned hood. The floor of the reverberatory oven is hence heated by the hot fumes which escape through the hood, and in this manner the foods or containers containing them on the floor are heated not only by the floor but also by the oven roof by radiation, the operation being that of a reverberatory oven. It should be noted that although in FIGS. 3 and 4 the cooking grill 18 is shown in its place, it may be removed when the device operates as an oven so as to allow the oven floor to be directly struck by the flames.

As clearly shown in the drawings members 31, 31' and 34 are arranged spaced from the walls of the box-shaped housing 10 for purpose of thermic insulation.

When in the inactive folded back position, the members comprising the oven are housed in vertical interspaces, whereas those comprising the hood are housed in horizontal interspaces, without any appreciable increase in bulk, so giving the finished cooking device a compact parallelopiped structure when not operating, its transformation from the inactive position to the operating position being extremely easy and rapid.

The described assembly of members gives the cooking device a high efficiency both with respect to the results obtained and the thermal efficiency, together with a versatility in use, since it can be used for cooking and roasting, it being possible to provide for any use the necessary air draught by acting on the hood structure. Because of this it constitutes a considerable improvement with respect to similar known devices, irrespective of the particular devices used for heat generation. The embodiment has been described by way of example only, and the invention may be realised with numerous modifications by persons expert in the art.

I claim:

1. A device for cooking, grilling, spit roasting, oven roasting or the like, of foods, comprising a box-shaped housing having an open top and a bottom provided with an air inlet, a combustion assembly defining a combustion zone inside said housing, a food supporting arrangement within said housing above said combustion zone, and a hood structure arranged over said open top and composed of collapsible sheet members including a back panel and two side panels, wherein said food supporting arrangement comprises a grill member removably arranged above said combustion zone and a collapsible cooking assembly including cooking plates having an operative position in which said plates are arranged partially covering said open top, and wherein said hood structure further includes plate members removably arranged between said two side panels to define a hood space around and above said open top having at least an opening for the outflow of the fumes variable in size by displacing said plate members, thereby to adjust the air draught through said device according to the food preparing requirements.

2. A device as claimed in claim 1, wherein said plate members include at least one front plate arranged between said two side panels and pivotable around an axis defined by an edge of said front plate, means being provided for locking said front plate at a number of positions while pivoted around said axis, thereby defining a front opening above said food supporting arrangement adjustable in size.

3. A device according to claims 2, wherein said plate members comprise a front plate arranged between said side panels and pivotable around an axis defined by an upper edge of said front plate, and a further plate closing said hood space above said front plate and delimiting with said back panel and said side panels an outflow opening for the fumes.

4. A device as claimed in claim 1, wherein said cooking plates comprise, at least two pivotable shelves having an operative position in which said shelves are arranged horizontally and partially superimposed to one another above said combustion zone, thereby defining therebetween a space for the flow of the fumes coming from said combustion zone and lapping said upper shelf, so heating it and causing it to radiate heat towards the food arranged on the said lower shelf.

5. A device as claimed in claim 4, wherein said lower shelf comprises two half shelves arranged pivotally around an axis substantially orthogonal to the axis around which said upper shelf is pivotally arranged.

6. A device as claimed in claims 5, wherein said upper shelf and said lower half shelves are hingedly connected to substantially flat supporting members slidable substantially parallel to a rear wall and side walls, respectively, of said box-shaped housing.

7. A device as claimed in claim 6, wherein at least said substantially flat supporting members carrying said half shelves are arranged spaced from said walls of said box-shaped housing, thereby defining an interspace for thermic insulation.

8. A device as claimed in claim 1, further comprising two covering plates slidable substantially horizontally over said open top and having an outer spreaded position in which they laterally project from said box-shaped housing and define a resting surface and an inner covering position in which they are arranged over said open top when said collapsible hood structure and said collapsible food cooking assembly are folded down and housed within said box-shaped housing.

* * * * *